J. Y. PORTER.
CONTROLLER REGULATOR FOR ELECTRIC MOTORS.
APPLICATION FILED FEB. 9, 1912.

1,053,642.

Patented Feb. 18, 1913.

2 SHEETS—SHEET 1.

Witnesses
Albert A. Hofmann
Lotta Lee Bray

Inventor
Joseph Y. Porter
By Ralzemond A. Parker
Attorney

J. Y. PORTER.
CONTROLLER REGULATOR FOR ELECTRIC MOTORS.
APPLICATION FILED FEB. 9, 1912.

1,053,642.

Patented Feb. 18, 1913.
2 SHEETS—SHEET 2.

Witnesses
Albert A. Hofmann
Lotta Lee Bray.

Inventor
Joseph Y. Porter

By Razemond A. Parker
Attorney

UNITED STATES PATENT OFFICE.

JOSEPH Y. PORTER, OF DETROIT, MICHIGAN.

CONTROLLER-REGULATOR FOR ELECTRIC MOTORS.

1,053,642.  Specification of Letters Patent.  Patented Feb. 18, 1913.

Application filed February 9, 1912. Serial No. 676,587.

*To all whom it may concern:*

Be it known that I, JOSEPH Y. PORTER, a citizen of the United States, residing at Detroit, county of Wayne, State of Michigan, have invented a certain new and useful Improvement in Controller - Regulators for Electric Motors, and declare the following to be a full, clear, and exact description of the same, such as will enable others skilled in the art to which it pertains to make and use the same, reference being had to the accompanying drawings, which form a part of this specification.

My invention relates to controller regulators for electric motors and has for its object a regulator which will prevent the rapid rotation of the controller shaft and prevents the unduly increase of the current force and compels the operator either to turn the shaft slowly or to stop the forward motion at intervals, which intervals depend upon the location of the stop members in the regulator but which permits the reverse motion as rapidly as may be desired.

Figure 1:
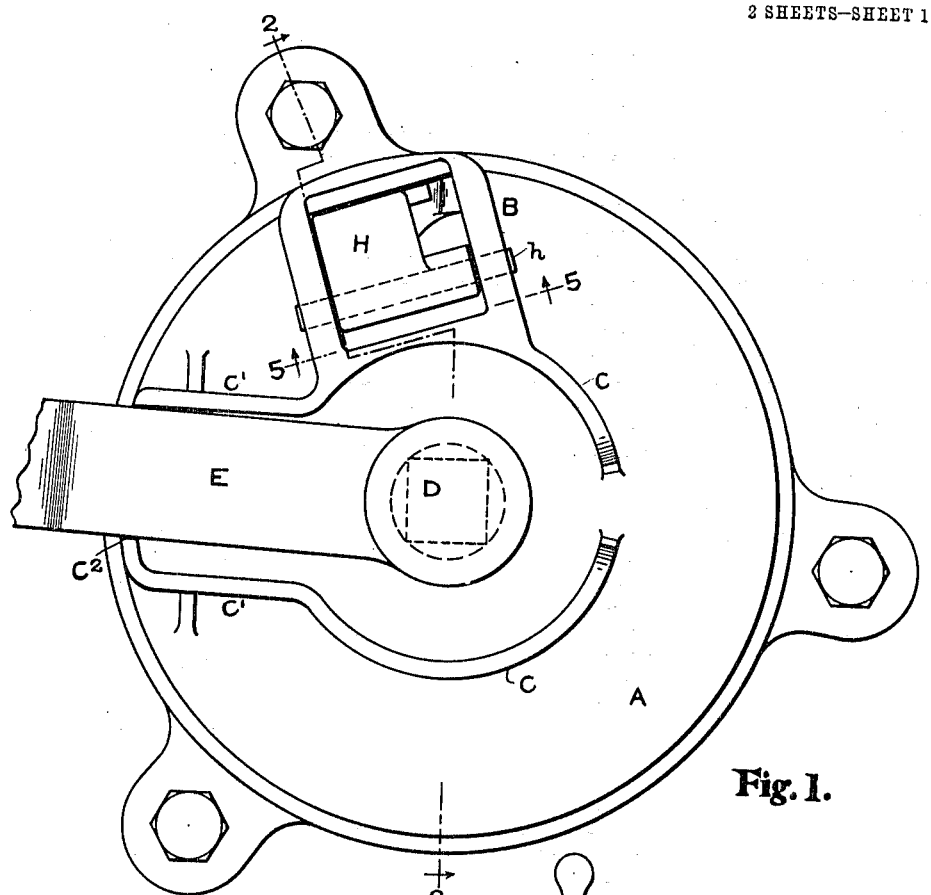
Figures 2, 3:
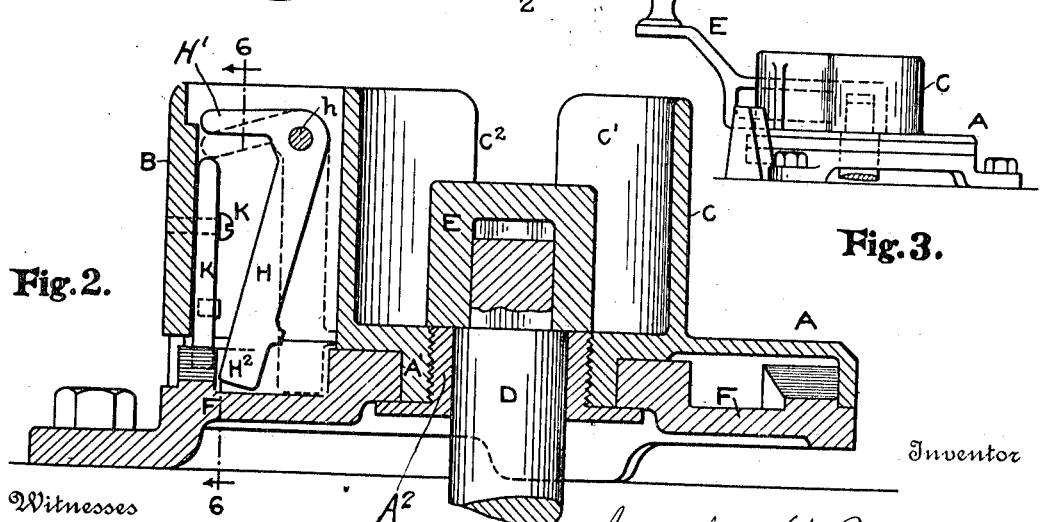
Figure 4:
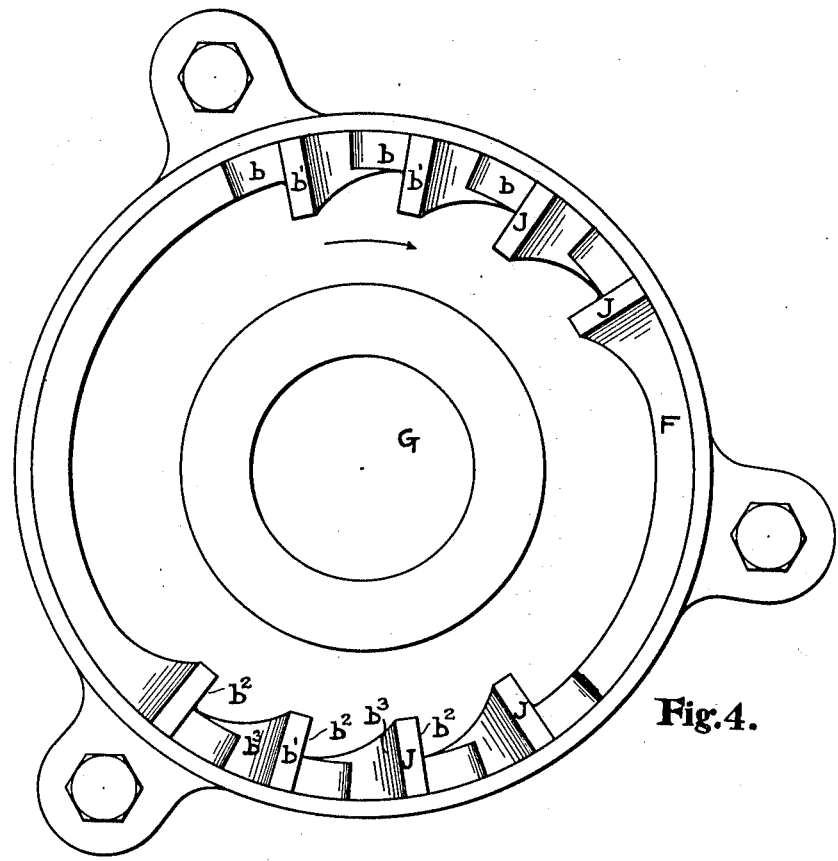
Figure 5:
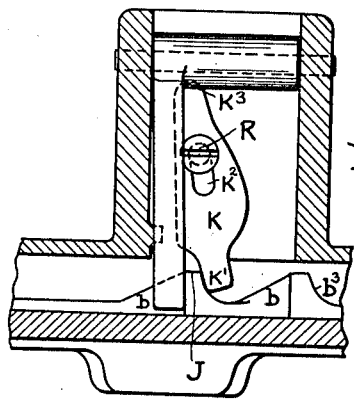
Figure 6:
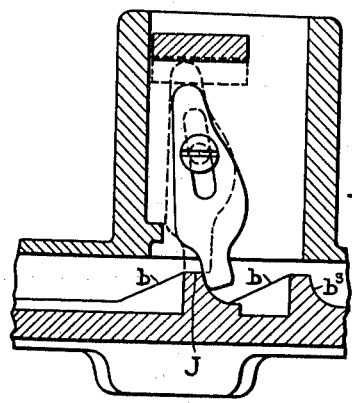

In the drawings:—Figure 1, is a top view of the regulator with a portion of it cut away to show the position of the parts. Fig. 2, is a cross section on the line 2—2 of Fig. 1. Fig. 3, is a vertical elevation of the regulator showing the position of the controller handle. Fig. 4, is a plan view of the lower plate of the regulator showing the stops and means for attaching it to the controller box. Fig. 5, is a cross section on the line 5—5 of Fig. 1 with the parts in one position. Fig. 6, is a cross section upon the same line with the tripping edge and parts in different positions indicated by dotted lines.

Similar letters refer to similar parts.

In the drawings, A represents a rotatable carrier which carries a housing B and also partially circular walls C, C.

D, is the top of the controller shaft; E, the controller handle.

The walls C, C are projected toward the edge of the rotatable carrier at C', C' and thus compel the carrier A to rotate when the handle is in position.

The top of the controller is closed off by a fixed plate F, which has a perforation G. The carrier A has a depending flange A' which is revolubly inserted in the hole G of the plate F. These flanges are internally threaded and an externally threaded flanged thimble $A^2$, which also has an orifice, when screwed into the depending flanges A', constitutes the means for holding the carrier A in position relative to the cover F of the controller. The controller shaft D extends therethrough and upon which shaft is fixed the handle E.

Upon the outer portion of the cover plate F is formed a series of stops J, J, of peculiar shape, as shown in Figs. 5 and 6, 5 and 6 being sectional views on the line $y$—$y$ of Fig. 1 and viewed from the interior of the carrier A.

That portion of the stops nearest to the outer part of the cover plate F is inclined as shown in Figs. 5 and 6, the inclination being marked $b$, $b$. The top of the stops $b'$, $b'$ extending from the outer edge of the cover plate inwardly beyond the inclined surface $b$ to about twice the distance and at this point, the wall $b^2$ is vertical. The opposite wall $b^3$ of the stop is substantially uniform in character with a sharp curvature, as shown in Figs. 5 and 6. In the housing B is mounted an angular piece H upon a pivot $h$. The lower portion $H^2$ of this piece is adapted to swing radially on a line in and out from the center of the carrier A, upon the pivot $h$.

The upper arm of the piece H forms an angle with the lower arm $H^2$ and pivoting as it does upon the pivot $h$, if the arm H' is raised or lowered, it is obvious that the lower end $H^2$ must swing horizontally in and out toward and from the center of the carrier A. The upper portion H' of the piece H is made wide for the purpose of providing a long bearing on the pivot $h$ and thus prevent irregular action. This piece H is arranged in the carrier A so that the swinging motion of the lower end $H^2$ will bring it into or out of contact with the vertical sides $f^2$ of the stops J, J, and when it is swung into contact with the stop J, it will prevent the rotation of the carrier A. A loose piece K is held upon a pivot $k$ in the housing, as shown in Figs. 2, 5 and 6. The lower end of this piece K at K' in its downward position is adapted to come in contact with the outer portions of the stops J, J. Formed in this piece K is a vertical slot $k^2$ engaging the pivot $k$ so as to permit a vertical movement as well as a swinging movement of the piece K, this vertical movement being substantially equal to the height of the stop J. The upper end $k^3$ of the piece K is adapted to come in contact with the angular projections H' of the piece H, and the stops, piece K and the angular portion H' of the piece H are so proportioned that a vertical movement of K on its pivot $k$, by virtue of the slot $k^2$ will raise the angular part H' of H and cause the lower part $H^2$ to swing outwardly the circumference of the carrier A and engage one of the stops J. On the rotation of the carrier A which is shown in Figs. 5, and 6 to be in the direction of the line of arrows when viewed from the interior and corresponding with the arrow of Fig. 4, the piece K rides upon the incline $f$ and over the top of the stop J and in doing so, it lifts the angular part H' of the piece H, thereby throwing the bottom end $H^2$ of this piece outwardly where it would engage the face $f^2$ of the corresponding stop.

As the piece K rides over the top of the stop J, it holds the lower end $H^2$ of the piece H in position to engage the stop F as stated. Just before, however, $H^2$ engages the stop, the proportions are so arranged that the piece K drops over on the other side of the stop J as shown in Fig. 5 (its elevation being shown in dotted lines in Fig. 6). But before the overhanging weight of the upper portion H' of the piece H can throw it outwardly so as to clear the stop J, the lower end $H^2$ comes in contact with the stop and thus checks the movement of the carrier A.

A slight movement backward of the carrier A causes the overhanging part H' to drop, thereby throwing the lower portion $H^2$ of the piece H inwardly toward the center of the carrier A far enough to clear the stop J and permit of the revolving motion of the carrier A to be continued until the piece K comes in contact with the inclined face $f$ and rides up to the top of the next succeeding stop J, thereby again lifting the overhanging part H' of the piece H and compelling its lower portion $H^2$ to be brought in contact with the next succeeding stop, compelling another stoppage of the rotary movement of the carrier A. This is or may be continued until all of the stops are passed.

On reversing the movement of the carrier A, the piece K simply pivots upon the pivot R and swings over the stops J, J without being lifted and without therefore compelling any engagement of the lower portion $H^2$ of the piece H with the stops. The reversing therefore of the carrier A does not bring anything in contact with the stops except the piece K.

It is obvious that both the pieces K and H operate by gravity, the piece K being hung upon the pivot R so that normally, it stands in the position shown in Fig. 5, the overhanging part H' of H being heavy enough to throw the lower portion $H^2$ into substantially a vertical position, as shown in dotted lines in Fig. 3 when such overhanging portion is not lifted as hereinbefore stated.

The operation of this device is sufficiently described in the foregoing specification. The operation is extremely simple and free from complication or the use of springs and the mechanism operates with great certainty.

It is obvious that the carrier A, while shown as revolving with a frictional contact under the cover F, may have ball bearings, if desired, so as to make such movement easier.

By accurately proportionating the parts and movements in such manner that the dropping of the piece K is coincident substantially with the contact of the lower end $H^2$ of the piece H with the face of the corresponding stop over which K has ridden, it will be impossible to move the carrier plate A so slowly as to prevent the operation of the stops. A slight movement, however, releases the pressure of the lower portion $H^2$ against the face of the stop J and it instantly slides away from it and permits the rotation of the carrier plate to the next stop as stated.

Having thus described my invention, what I desire to claim is:—

1. In a controller regulator, the combination of an angular pawl pivoted by a pivot substantially in a plane parallel to the plane of rotation of a carrier plate, and at right angles substantially to a radial line from the center thereof, a carrier plate carrying said pawl, a corresponding plate having stops, a pawl actuator having a vertical movement adapted to engage the upper portion of said pawl and adapted to ride over the stops located upon a plate with a relative movement from the carrier plate, the lifting of the upper end of said pawl bringing the other end into position to engage the stop, said actuator upon further movement of the carrier plate dropping below said stop whereby said pawl is permitted to shift its position with respect to said stop and allow a further rotation of said carrier plate, substantially as described.

2. In a controller regulator, the combination of a cover plate carrying stops, said stops having an inclined surface leading to the top thereof for one portion of each of said stops and a vertical portion on said stop adjacent to said inclined portion, a carrier plate, a pawl rotatably fixed thereon, the lower portion of said pawl being adapted to swing on radial lines with respect to said carrier plate, said pawl having an overhang beyond said pivot, a pawl actuator adapted to move vertically and swing horizontally at its lower end in one direction, and means for preventing its swinging in the opposite direction and adapted to ride over the inclined surface of said stops and thereby engage the overhang of said pawl to compel the movement of said pawl outwardly into engagement with the stops, substantially as described.

3. In a controller regulator, the combination of two plates having a relative rotative motion with respect to each other, one of said plates carrying stops, the other of said plates carrying an angular pawl so pivoted that the lower end is adapted to swing in a radial line from the center of said plate, a pawl actuator adapted by riding over said stops to contact with said pawl and force its lower end into engagement with said stops and to be withdrawn therefrom and permit the lower end to swing out of engagement with said stops, substantially as described.

4. In a controller regulator, the combination with an oscillating pawl, and a vertically moving oscillating pawl actuator contacting with one end of said pawl, a series of stops adapted to actuate said actuator and adapted to engage the lower end of said pawl when actuated, a plate carrying said stops, and a carrier carrying said pawl and actuator, substantially as described.

5. In a controller regulator, the combination of two plates having a relative rotative motion with respect to each other, one of said plates carrying stops, the other of said plates carrying an angular pawl so pivoted that the lower end is adapted to swing in a radial line from the center of said plates carrying it, a pawl actuator also carried by said plate adapted by riding over said stops on the opposite plate to contact with said pawl and force its lower end into engagement with said stops and adapted to be withdrawn therefrom and permit the lower end of said pawl to swing out of engagement with said stops, and means for rotating one of said carrier plates, substantially as described.

In testimony whereof, I sign this specification in the presence of two witnesses.

JOSEPH Y. PORTER.

Witnesses:
 LOTTA LEE BRAY,
 R. A. PARKER.